H. SCHLOMER.
NUT LOCK.
APPLICATION FILED DEC. 8, 1910.
990,300.
Patented Apr. 25, 1911.
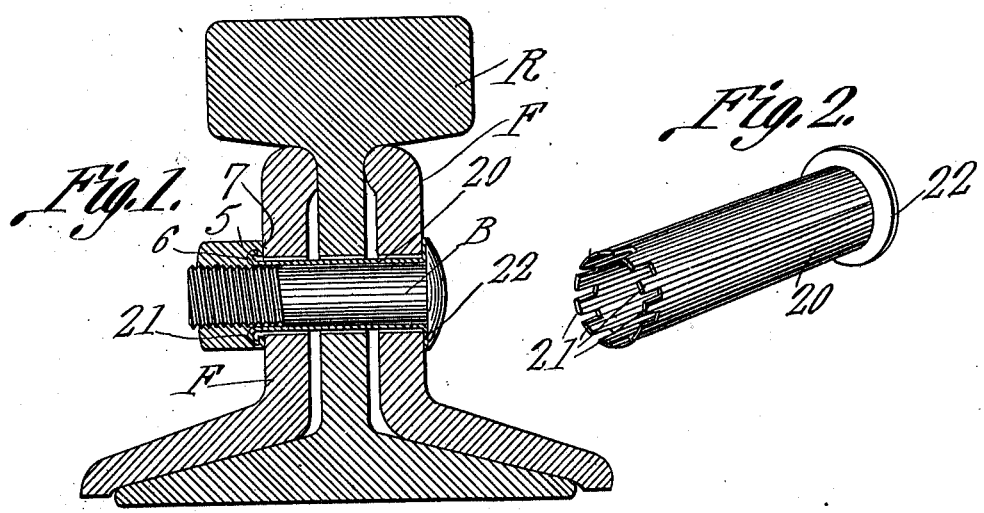
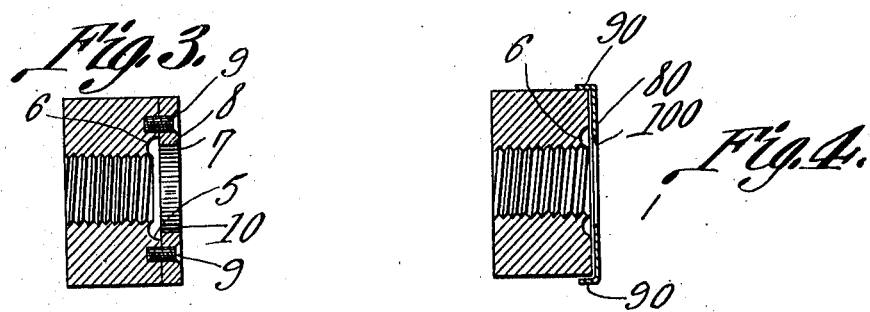
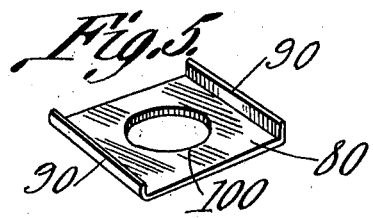
Witnesses
Henry Schlomer
inventor
by
Attorneys

UNITED STATES PATENT OFFICE.

HENRY SCHLOMER, OF PARKSTON, SOUTH DAKOTA.

NUT-LOCK.

990,300. Specification of Letters Patent. Patented Apr. 25, 1911.

Application filed December 8, 1910. Serial No. 596,286.

*To all whom it may concern:*

Be it known that I, HENRY SCHLOMER, a citizen of the United States, residing at Parkston, in the county of Hutchinson and State of South Dakota, have invented a new and useful Nut-Lock, of which the following is a specification.

This invention relates to nut and bolt locks, and more especially to those employing a flexible key; and the object of the same is to produce a nut lock which will require but slight modification in the shape of the nut and the use of a tubular key.

To this end the invention consists in the details set forth and claimed below, and as shown in the drawings wherein—

Figure 1 is a sectional view through a rail and its fish plates, showing this improved nut lock in use. Fig. 2 is a perspective detail of the tubular key or sheath. Figs. 3 and 4 are sectional views of modifications, and Fig. 5 is a perspective detail of the plate employed in Fig. 4.

It will not be necessary to describe the rail R or fish plates F herein employed to show the parts which are to be connected by the bolt B, the latter being of the ordinary construction and its threaded end screwing into the nut N as shown. Around its threaded opening and at one end thereof said nut has an annular groove 5 whose bottom 6 is dished so that it first descends from the threaded opening away from the adjacent end of the nut, and then curves as best seen in the sectional views in Figs. 3 and 4. The front wall 7 of this groove is flat, and as seen in Fig. 1 it may be part of the nut itself as when the groove is cut therein. In Fig. 3 it is shown as the rear face of a plate 8 secured to the end of the nut by any suitable means such as screws 9, the opening 10 in the plate being larger than the threaded opening through the nut so as to admit the toothed end of the sheath to be described below. In Fig. 4 the plate 80 is somewhat thinner than that shown in Fig. 3, being preferably of sheet metal formed with the central opening 100 and with two opposite side lips 90 which constitute means equivalent to the screws 9 for holding this plate 80 upon the nut and causing it to rotate therewith.

In Fig. 2 is shown the tubular sheath 20 forming the other part of this improved nut lock, and which is by preference made of some pliable metal such as copper or tin with one end slitted into tongues 21. The other end may have a flange 22, although the latter might be omitted.

In use the sheath is supplied in the condition shown in Fig. 2 and is slipped upon the bolt, and then both are put through the parts to be connected. The nut is then screwed onto the threaded end of the bolt and the tongues enter the groove in the nut. As the latter is tightened up the tongues strike the rounded bottom 6 of the groove and are curved outward as indicated in Fig. 1, until finally their extremities strike the front wall of said groove whether that wall be integral with the nut as in Fig. 1 or be the rear face of a plate as in Figs. 3 and 4 and in either of which latter cases the plate must be attached to the nut by some means. As the nut is driven home the tongues are curled as much as shown in Fig. 1 or perhaps more so, and the nut is thereby frictionally prevented from coming loose. When it is to be removed, it can be simply unscrewed and the tongues will be again straightened out. In either movement the plate 8 or the plate 80 will turn with the nut, or if the modification shown in Figs. 4 and 5 is employed the lips 90 may be bent outward before unscrewing the nut and the latter action will then not necessarily even straighten out the tongues.

What is claimed as new is:—

1. A nut lock comprising a nut having around and at one end of its threaded opening a groove provided with a rounded bottom and a flat front wall; and a tubular sheath of pliable metal adapted to surround the bolt below its head and slitted at one extremity into tongues to enter said groove.

2. A nut lock comprising a nut having around and at one end of its threaded opening a groove provided with a rounded bottom and a flat front wall; and a tubular sheath of pliable metal adapted to surround the bolt below its head and slitted at one extremity into tongues to enter said groove, its opposite extremity having a flange beneath the head of the bolt.

3. The herein described nut lock, the same comprising a tubular sheath adapted to surround the bolt and slitted at one extremity into tongues, a nut having in one end around its threaded opening an annular groove with a dished bottom, a plate having an opening larger than said threaded opening and smaller than the largest circumference of said groove, and means for attaching the plate to the nut so as to require its rotation therewith.

4. The herein described nut lock, the same comprising a tubular sheath adapted to surround the bolt and slitted at one extremity into tongues, a nut having in one end around its threaded opening an annular groove with a dished bottom, and a plate having an opening larger than said threaded opening and smaller than the largest circumference of said groove and lips at its edges bent over the side faces of the nut.

In testimony that I claim the foregoing as my own, I have hereto affixed my signature in the presence of two witnesses.

HENRY SCHLOMER.

Witnesses:
WILLIAM SCHMIERER,
JOHN MOEYER.

Copies of this patent may be obtained for five cents each, by addressing the "Commissioner of Patents, Washington, D. C."